US012279156B2

(12) United States Patent
Ahmed et al.

(10) Patent No.: US 12,279,156 B2
(45) Date of Patent: Apr. 15, 2025

(54) TRAFFIC TIMING CONTROL FOR AN OPEN RADIO ACCESS NETWORK IN A CLOUD RADIO ACCESS NETWORK SYSTEM

(71) Applicant: Mavenir Systems, Inc., Richardson, TX (US)

(72) Inventors: Wessam Afifi Ahmed, Plano, TX (US); Young-Han Nam, Plano, TX (US); Sridhar Rajagopal, Plano, TX (US); Rasiklal Kachhla, Plano, TX (US)

(73) Assignee: Mavenir Systems, Inc., Richardson, TX (US)

( * ) Notice: Subject to any disclaimer, the term of this patent is extended or adjusted under 35 U.S.C. 154(b) by 213 days.

(21) Appl. No.: 17/335,655

(22) Filed: Jun. 1, 2021

(65) Prior Publication Data

US 2021/0385686 A1     Dec. 9, 2021

Related U.S. Application Data

(60) Provisional application No. 63/034,067, filed on Jun. 3, 2020.

(51) Int. Cl.
*H04W 28/06* (2009.01)
*H04L 47/27* (2022.01)
(Continued)

(52) U.S. Cl.
CPC .............. *H04W 28/06* (2013.01); *H04L 47/27* (2013.01); *H04W 8/24* (2013.01); *H04W 56/0045* (2013.01); *H04W 72/04* (2013.01)

(58) Field of Classification Search
CPC ..... H04L 41/04; H04L 41/0823; H04L 47/27; H04W 24/02
See application file for complete search history.

(56) References Cited

U.S. PATENT DOCUMENTS

| 5,905,715 A * | 5/1999 | Azarmi ............... H04L 41/5009 |
| | | 714/25 |
| 2010/0309281 A1 * | 12/2010 | Lim ........................ G02B 7/02 |
| | | 347/257 |

(Continued)

FOREIGN PATENT DOCUMENTS

| WO | WO-2018035489 A1 * | 2/2018 | .......... H04W 56/003 |
| WO | WO-2021090444 A1 * | 5/2021 | ............ H04W 24/02 |

(Continued)

OTHER PUBLICATIONS

ORAN-WG1.OAM Architecture v01.00 "O-RAN Operations and Maintenance Architecture", O-RAN Alliance, Working Group 1, Jul. 2019.

(Continued)

*Primary Examiner* — Wutchung Chu
*Assistant Examiner* — Berhanu D Belete
(74) *Attorney, Agent, or Firm* — Ruggiero McAllister & McMahon LLC

(57) ABSTRACT

There is provided a method of operating an Open Radio Access Network (O-RAN) having an O-RAN radio unit (O-RU) and an O-RU controller. The method includes sending, from the O-RU to the O-RU controller, (i) a message informing that the O-RU supports a feature such as (a) a plurality of delay management profiles, and/or (b) a plurality of transmission window sizes, and (ii) a report of capabilities of the O-RU, where the report includes a parameter such as (a) a quantity of supported delay management profiles, (b) supported window sizes for each of the plurality of delay management profiles, and/or (c) a supported window offset for each of the plurality of delay management profiles. The O-RU controller configures the O-RU based on the feature and the parameter.

27 Claims, 14 Drawing Sheets

(51) Int. Cl.
*H04W 8/24* (2009.01)
*H04W 56/00* (2009.01)
*H04W 72/04* (2023.01)

(56) References Cited

U.S. PATENT DOCUMENTS

| | | | |
|---|---|---|---|
| 2012/0230310 A1* | 9/2012 | Roy | H04W 74/0808 |
| | | | 370/338 |
| 2013/0102312 A1* | 4/2013 | Nilsson | H04W 36/08 |
| | | | 455/436 |
| 2015/0257024 A1* | 9/2015 | Baid | H04W 76/22 |
| | | | 370/338 |
| 2019/0053120 A1* | 2/2019 | Park | H04W 36/305 |
| 2019/0313288 A1* | 10/2019 | Li | H04W 24/02 |
| 2020/0053777 A1* | 2/2020 | Babaei | H04W 74/006 |
| 2020/0305159 A1* | 9/2020 | Raghothaman | H04W 72/0453 |
| 2020/0314826 A1* | 10/2020 | Sharma | H04W 72/046 |
| 2021/0195635 A1* | 6/2021 | Wänstedt | H04W 8/24 |
| 2021/0204148 A1* | 7/2021 | Chou | H04W 24/02 |
| 2021/0258866 A1* | 8/2021 | Chou | H04W 48/16 |
| 2021/0314211 A1* | 10/2021 | Grayson | H04L 41/0213 |
| 2021/0385169 A1* | 12/2021 | Urman | H04L 1/08 |
| 2022/0158897 A1* | 5/2022 | Chou | H04L 41/082 |
| 2022/0159525 A1* | 5/2022 | Chou | H04W 36/22 |
| 2022/0201796 A1* | 6/2022 | Nakata | H04W 80/02 |
| 2022/0295309 A1* | 9/2022 | Akhtar | H04W 24/02 |

FOREIGN PATENT DOCUMENTS

| | | | | |
|---|---|---|---|---|
| WO | WO-2021117245 A1 * | 6/2021 | | H04W 56/003 |
| WO | WO-2021144976 A1 * | 7/2021 | | H04W 56/003 |
| WO | WO-2021166044 A1 * | 8/2021 | | H04W 56/003 |

OTHER PUBLICATIONS

ORAN-WG4.CUS.0-v02.00: "O-RAN Fronthaul Working Group Control, User and Synchronization Plane Specification" Release 02.00, Jul. 2019.

Extended European Search Report for corresponding European application EP21177553 9 pages, dated Oct. 11, 2021.

ORAN-WG4.CUS.0-v03 "Control, User and Synchronization Plane Specification", O-RAN Alliance, Working Group 4, 2020.

ORAN-WG4.MP.0-v02.00: "O-RAN Fronthaul Working Group Management Plane Specification" Release 02.00, Aug. 2019.

* cited by examiner

Section Extension 12 Data Format

| | | |
|---|---|---|
| ef | extType = 0x0C | 1 | Octet N |
| cEnable | extLen = 0x02 (2 words) | 1 | N+1 |
| | C-planeDelayOffset [13:8] | 1 | N+2 |
| | C-planeDelayOffset [7:0] | 1 | N+3 |
| uEnable | U-planeDelayOffset [13:8] | 1 | N+4 |
| | U-planeDelayOffset [7:0] | 1 | N+5 |
| | reserved | 1 | N+6 |
| | reserved | 1 | N+7 |

FIG. 2

Another embodiment of Section Extension 12 Data Format, where only the C-plane related parameters are included in the section extension

| ef | | | | 1 | Octet N |
|---|---|---|---|---|---|
| extType = 0x0C | | | | | |
| extLen = 0x01 (1 word) | | | | 1 | N+1 |
| cEnable | cInd | C-planeDelayOffset [13:8] | | 1 | N+2 |
| C-planeDelayOffset [7:0] | | | | 1 | N+3 |

FIG. 5

Another embodiment of Section Extension 12 Data Format, where only the U-plane related parameters are included in the section extension

| ef | | | extType = 0x0C | 1 | Octet N |
|---|---|---|---|---|---|
| | | | extLen = 0x01 (1 word) | 1 | N+1 |
| uEnable | uInd | | U-planeDelayOffset [13:8] | 1 | N+4 |
| | | | U-planeDelayOffset [7:0] | 1 | N+5 |

FIG. 6

Section Extension 12 Data Format

| | | | |
|---|---|---|---|
| ef | extType = 0x0C | 1 | Octet N |
| | extLen = 0x02 (2 words) | 1 | N+1 |
| cEnable | reserved | C-planeDelayOffset [13:8] | 1 | N+2 |
| | C-planeDelayOffset [7:0] | 1 | N+3 |
| uEnable | Reserved | U-planeDelayOffset [13:8] | 1 | N+4 |
| | U-planeDelayOffset [7:0] | 1 | N+5 |
| | reserved | 1 | N+6 |
| | reserved | 1 | N+7 |

FIG. 7

Another Embodiment of Section Extension 12 Data Format, where the window length is included in the section extension.

| | | | 1 | Octet N |
|---|---|---|---|---|
| ef | | extType = 0x0C | 1 | N+1 |
| | | extLen = 0x02 (2 words) | 1 | N+2 |
| cEnable | cInd | WindowLength/C-planeDelayOffset [13:8] | 1 | N+3 |
| | | WindowLength/C-planeDelayOffset [7:0] | 1 | N+4 |
| uEnable | uInd | WindowLength/U-planeDelayOffset [13:8] | 1 | N+5 |
| | | WindowLength/U-planeDelayOffset [7:0] | 1 | N+6 |
| | | reserved | 1 | N+7 |
| | | Reserved | | |

FIG. 8

Another embodiment of Section Extension 12 Data Format, where only the C-plane related parameters are included in the section extension

| ef | extType = 0x0C | 1 | Octet N |
|---|---|---|---|
| extLen = 0x01 (1 word) | | 1 | N+1 |
| cEnable | cInd | WindowLength/C-planeDelayOffset [13:8] | 1 | N+2 |
| WindowLength/C-planeDelayOffset [7:0] | | 1 | N+3 |

FIG. 11

Another embodiment of Section Extension 12 Data Format, where only the U-plane related parameters are included in the section extension

| ef | | extType = 0x0C | 1 | Octet N |
|---|---|---|---|---|
| | | extLen = 0x01 (1 word) | 1 | N+1 |
| uEnable | uInd | WindowLength/U-planeDelayOffset [13:8] | 1 | N+4 |
| | | WindowLength/U-planeDelayOffset [7:0] | 1 | N+5 |

FIG. 12

Section Extension 13 Data Format

| | | | Octet N |
|---|---|---|---|
| ef | extType = 0x0C | 1 | N+1 |
| | extLen = 0x01 (1 word) | 1 | |
| Reserved | delayMngmtProfileID [3:0] | 1 | N+2 |
| Reserved | ucActivate [1:0] | 1 | N+3 |

FIG. 13

Another Embodiment of Section Extension 13 Data Format

| ef | extType = 0x0C | 1 | Octet N |
|---|---|---|---|
| | extLen = 0x01 (1 word) | 1 | N+1 |
| Reserved | delayMngmtProfileID [3:0] | 1 | N+2 |
| Reserved | | 1 | N+3 |

FIG. 14

TRAFFIC TIMING CONTROL FOR AN OPEN RADIO ACCESS NETWORK IN A CLOUD RADIO ACCESS NETWORK SYSTEM

CROSS-REFERENCE TO RELATED APPLICATIONS

The present application is claiming priority of U.S. Provisional Patent Application Ser. No. 63/034,067, filed on Jun. 3, 2020, the content of which is herein incorporated by reference.

BACKGROUND OF THE DISCLOSURE

1. Field of the Disclosure

The present disclosure is directed to a radio access network (RAN) design for 4G-based and 5G-based mobile networks. Traditionally, a RAN was built as an integrated unit where the entire RAN was processed. RANs traditionally use application specific hardware for processing, making them difficult to upgrade and evolve. As future networks evolve to have massive densification of networks to support increased capacity requirements, there is a growing need to reduce the CAPEX/OPEX of RAN deployment and make a solution scalable and easy to upgrade.

The present disclosure is in the field of cloud-based RANs, where a significant portion of the RAN layer processing is performed at a central unit (CU) and a distributed unit (DU). Both CUs and DUs are also known as the baseband units (BBUs). CUs are usually located in the cloud, i.e., on the internet, on commercial off the shelf servers, while DUs can be distributed, and while the radio frequency (RF) and real-time critical functions can be processed in the remote radio unit (RU).

The context of the present disclosure is related to a method for enabling traffic timing control for both control plane (C-plane) and user plane (U-plane). This includes exchanging certain messages between an open radio access network (O-RAN) compliant RU (O-RU) and an O-RAN compliant DU (O-DU) via an O-RAN fronthaul interface. Non-delay managed traffic is defined as the traffic, e.g., C-plane and/or U-plane, that does not have to follow the default delay management profile agreed upon between the O-DU and O-RU.

2. Description of the Related Art

The approaches described in this section are approaches that could be pursued, but not necessarily approaches that have been previously conceived or pursued. Therefore, the approaches described in this section may not be prior art to the claims in this application and are not admitted as being prior art by inclusion in this section.

The following documents provide background information on O-RAN operations.
(a) ORAN-WG4.CUS.0-v03 "Control, User and Synchronization Plane Specification", O-RAN ALLIANCE, Working Group 4; and
(b) ORAN-WG4.MP.0-v02.00: O-RAN Fronthaul Working Group Management Plane Specification, Release 02.00, August 2019

An Open Radio Access Network (O-RAN) is a totally disaggregated approach to deploying mobile fronthaul and midhaul networks, built entirely on cloud native principles. The O-RAN Alliance issues specifications and releases open source software under the auspices of the Linux Foundation.

An O-RAN Distributed Unit (O-DU) is a part of an O-RAN system typically implemented in software. More specifically, an O-DU is a logical node hosting RLC/MAC/High-PHY layers based on a lower layer functional split.

An O-RAN Radio Unit (O-RU) is a logical node hosting Low-PHY layer and RF processing based on a lower layer functional split. This is similar to 3GPP's "TRP" or "RRH" but more specific in including the Low-PHY layer (FFT/iFFT, PRACH extraction).

User equipment (UE) is a device allowing a user access to network services, such as a mobile phone.

An uplink (UL) refers to the traffic flow from the UE to the network and through different network components in the uplink direction. From the UE to the O-RU, the interface is air, while the UL traffic from the O-RU to the O-DU can have different forms (e.g., Ethernet connection).

A downlink (DL) refers to the traffic flow through network components in the downlink direction and from the network to the UE. From the O-DU to the O-RU, the fronthaul interface can have different forms (e.g., Ethernet), while from the O-RU to the UE is air interface.

A sounding reference signal (SRS) is a reference signal sent in the UL direction from the UE to the network for the purpose of channel sounding.

A channel estimate is the outcome of the channel estimation function, which is the process of estimating the channel coefficients between the UE and the network.

A combining matrix is a matrix sent from the O-DU to the O-RU via the fronthaul interface to be used at the O-RU to process the UL data.

Beamforming is the technique of focusing a wireless signal in a specific direction for a specific user or a set of users, rather than spreading the signal in all directions, e.g., using an omni/broadcast antenna. There are several types of beamforming such as digital, analog, or hybrid beamforming. There are different methods of achieving beamforming, e.g., using an array of antenna elements, where each element is fed separately with the signal to be transmitted. These signals have specific phases and amplitudes, designed to steer the signal in a specific direction.

A physical uplink shared channel (PUSCH) is the UL data channel.

A demodulation reference signal (DMRS) is a reference signal used by the received node for channel estimation and to demodulate the received signal.

There are four planes specified in the O-RAN specifications namely a user-plane (U-plane), a control plane (C-plane), a synchronization plane (S-plane), and a management-plane (M-plane).

A U-plane is a User Plane, which refers to IQ sample data transferred between O-DU and O-RU.

A C-plane is a Control Plane, which refers specifically to real-time control between O-DU and O-RU and should not be confused with the UE's control plane.

An S-plane is a Synchronization Plane, which refers to traffic between the O-RU or O-DU to a synchronization controller, which is generally an IEEE 1588 Grand Master. However, Grand Master functionality may be embedded in the O-DU.

An M-plane is a Management Plane, which refers to non-real-time management operations to and from the O-RU. These non-real time management operations are executed by the O-RU and an O-RU controller in both directions, where the O-RU controller can reside in the O-DU or a service management and orchestration system (SMO), or can be a separate entity.

An M-plane interface is a link between the O-RU controller and the O-RU that carries non-real-time management information back and forth.

Section extension data is additional information attached towards the end of the section data in the C-plane message flowing mainly from the O-DU to the O-RU to convey additional real-time control information that cannot be added in a C-plane data section.

The main focus of the present disclosure is the C-plane, U-plane, and M-plane messages.

3GPP has defined multiple split options across the entire RAN. There are multiple factors affecting the selection of the fronthaul split option such as bandwidth, latency, implementation cost, virtualization benefits, complexity of the fronthaul interface, expansion flexibility, computing power, and memory requirement.

One of the most common splits that are standardized recently by the O-RAN ALLIANCE is split option 7-2x (Intra-PHY split). This split has multiple advantages such as simplicity, transport bandwidth scalability, beamforming support, interoperability, support for advanced receivers and inter-cell coordination, lower O-RU complexity, future proof-ness, interface and functions symmetry.

One of the main technologies that uses the O-RAN 7.2x specifications is 4G/5G massive MIMO (mMIMO). In mMIMO systems, the gNB, i.e., logical radio node, serves multiple users at the same time using the same time/frequency resources. One of the main essential techniques to enable mMIMO is beamforming, where the O-DU sends complex IQ (In-phase/Quadrature-phase) beamforming weights to the O-RU in real-time via the C-plane. The O-RU applies these beamforming weights to the U-plane data and then sends the processed data over the air. On the other hand, based on the O-RAN delay management model, the O-DU has to send the beamforming weights within a predefined window (Tx window). Doing so with the beamforming weights (and since these weights have a large size) will cause the fronthaul (FH) throughput to have a very high peak (i.e., larger than the average fronthaul throughput). This may cause an increase in the FH bandwidth requirement and hence a more expensive FH link between the O-DU and O-RU.

Another problem occurs in uplink (UL), where user equipment (UEs) sends sounding reference signals (SRS) over a relatively long period of time (tens of milliseconds (ms)), which are sent to the O-DU from the O-RU via the fronthaul interface. Using the SRS signal, the O-DU then calculates channel estimates, user pairing and a combining matrix for the scheduled users. The O-DU sends the combining matrix weights to the O-RU, which in return applies these weights to the physical uplink shared channel (PUSCH) symbols and sends the frequency domain IQ samples to the O-DU.

Although split option 7-2x enables multiple advanced features such as beamforming, and UL cooperative multi-point (CoMP), system performance may degrade in certain scenarios such as UL mMIMO for high-speed user equipment (UE). The reason for such degradation in high-speed UE scenarios is channel aging. Specifically, the SRS signals are sent over a relatively long period of time, e.g., tens of ms. By the time, the O-RU applies the combining weights to the PUSCH symbols, these weights become inaccurate since the SRS signals are outdated, i.e., SRS to UL-data TTI delay is long. In other words, the channel gains between the UEs and the gNB are no longer reflected accurately by the SRS signals, since UEs are moving fast in such a scenario, which causes interference and hence throughput degradation during the combining process in the UL chain.

Thus, one of the main problems that the O-DU and O-RU have is that they have to follow a delay management profile as defined in the O-RAN standard, i.e., both units have to send/receive data within predefined windows.

For the DL, there is currently no method to enable the O-DU to mark C-plane traffic as non-delay managed. Furthermore, present methods do not provide any technique for defining different delay management parameters other than those defined in the default delay management profile.

On the other hand, there is a method to mark certain U-plane traffic as non-delay managed traffic. This is done by statically assigning certain Extended Antenna-Carrier Identifiers (eAxC IDs) to such traffic. However, multiple problems exist in using the method:

(1) This is a static method done via M-plane, i.e., that cannot be used to dynamically change the non-delay managed traffic assignment in real-time.
(2) The prior art does not define new relaxed delay management parameters or any boundaries for the non-delay managed U-plane traffic. This makes it difficult for the O-DU and O-RU to set expectations for the time where "non-delay managed traffic" is expected to be transmitted/received.
(3) In certain cases, e.g., mMIMO, with a limited number of bits allocated for the O-RU port ID (this is a field in the eAxC ID) and with multiple non-delay managed traffic, we may run out of eAxC IDs.

SUMMARY OF THE DISCLOSURE

The present disclosure provides methods for O-RAN traffic control and to enable non-delay managed C-plane and/or U-plane traffic in the context of the O-RAN fronthaul interface.

The present disclosure provides a method for enabling marking C-plane messages as non-delay managed traffic. In addition, it solves the above issues with the existing method for U-plane traffic. It also provides a technique to link certain C-plane and/or U-plane traffic to specific delay management parameters and another method to decouple the C-plane and U-plane delay parameters.

In this regard, the present disclosure provides a method of operating an O-RAN having an O-RU and an O-RU controller. The method includes sending, from the O-RU to the O-RU controller, (i) a message informing that the O-RU supports a feature such as (a) a plurality of delay management profiles, and/or (b) a plurality of transmission window sizes, and (ii) a report of capabilities of the O-RU, where the report includes a parameter such as (a) a quantity of supported delay management profiles, (b) supported window sizes for each of the plurality of delay management profiles, and/or (c) a supported window offset for each of the plurality of delay management profiles. The O-RU controller configures the O-RU based on the feature and the parameter.

BRIEF DESCRIPTION OF THE DRAWINGS

FIG. 2 is a table of Section Extension 12 Data Format.

FIG. 5 is another embodiment of Section Extension 12 Data Format, where only the C-plane related parameters are included in the section extension.

FIG. 6 is another embodiment of Section Extension 12 Data Format, where only the U-plane related parameters are included in the section extension.

FIG. 7 is another embodiment of Section Extension 12 Data Format.

FIG. 8 is another Embodiment of Section Extension 12 Data Format, where the window length is included in the section extension.

FIG. 11 is another embodiment of Section Extension 12 Data Format, where only the C-plane related parameters are included in the section extension.

FIG. 12 is another embodiment of Section Extension 12 Data Format, where only the U-plane related parameters are included in the section extension.

FIG. 13 is a table of Section Extension 13 Data Format.

FIG. 14 is another embodiment of Section Extension 13 Data Format.

A component or a feature that is common to more than one drawing is indicated with the same reference number in each of the drawings.

DESCRIPTION OF THE DISCLOSURE

At the end of this description, there is a glossary of terms.

Figure 1:
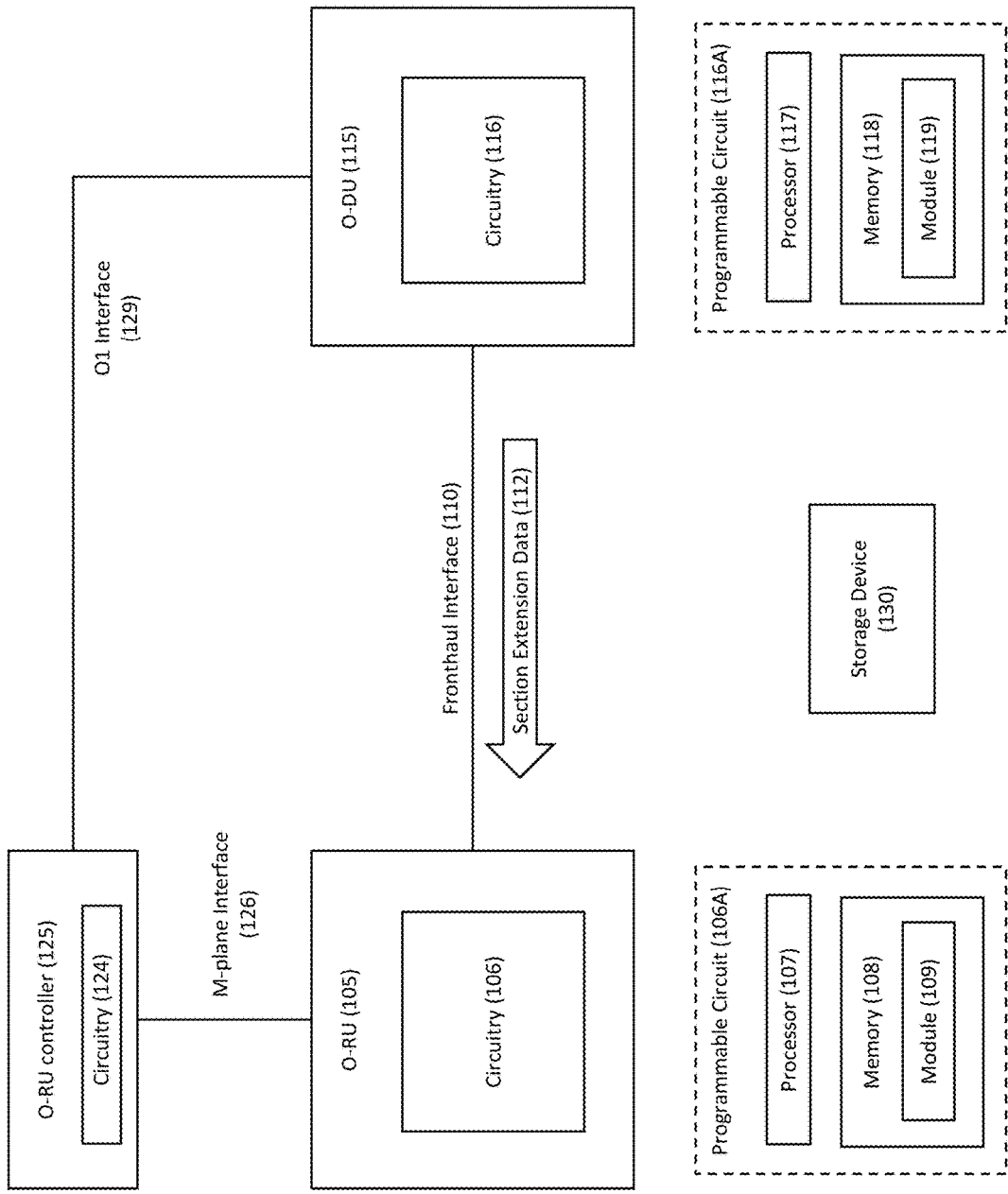
FIG. 1 is a block diagram of a system for controlling traffic timing for an O-RAN in a cloud RAN.

FIG. 1 is a block diagram of a system 100 for enabling traffic control for an O-RAN in a cloud RAN. System 100 includes an O-RU 105 and an O-DU 115 that are communicatively coupled via a fronthaul interface 110, also referred to herein as FH 110. A variety of data is communicated via FH 110, including DL and UL U-plane data packets, DL C-plane messages that include data sections and section extension data 112. O-DU 115 instructs O-RU 105 using M-plane and/or C-plane messages on how to process received messages from O-DU 115 (so that O-RU 105 can send data, reference signals and control information to UE), and on how to send messages (received messages from UE) to O-DU 115. O-RU 105 and O-DU 115 cooperate with one another to perform a method that enables traffic timing control for C-plane and/or U-plane traffic in the context of FH 110. The method marks C-plane messages as non-delay managed traffic. It also provides a technique to link certain C-plane and/or U-plane traffic to specific delay management parameters. In addition, it enables O-DU 115 to specify transmit windows for UL U-plane packets.

O-RU 105 includes electronic circuitry, namely circuitry 106, that performs operations on behalf of O-RU 105 to execute methods described herein. Circuity 106 may be implemented with any or all of (a) discrete electronic components, (b) firmware, and (c) a programmable circuit 106A. O-RU 105 represents mainly an O-RAN-compliant O-RU which executes the lower physical layer blocks such as FFT/IFFT, CP removal/addition, beamforming, analog to digital converter, digital to analog convertor, and RF functions.

Programmable circuit 106A, which is an optional implementation of circuitry 106, includes a processor 107 and a memory 108. Processor 107 is an electronic device configured of logic circuitry that responds to and executes instructions. Memory 108 is a tangible, non-transitory, computer-readable storage device encoded with a computer program. In this regard, memory 108 stores data and instructions, i.e., program code, that are readable and executable by processor 107 for controlling operations of processor 107. Memory 108 may be implemented in a random access memory (RAM), a hard drive, a read only memory (ROM), or a combination thereof. One of the components of memory 108 is a program module, namely module 109. Module 109 contains instructions for controlling processor 107 to execute operations described herein on behalf of O-RU 105.

O-DU 115 includes electronic circuitry, namely circuitry 116, that performs operations on behalf of O-DU 115 to execute methods described herein. Circuity 116 may be implemented with any or all of (a) discrete electronic components, (b) firmware, and (c) a programmable circuit 116A. O-DU 115 represents an O-RAN compliant O-DU which executes functions such as higher physical layer (based on O-RAN split or similar lower layer splits), MAC, scheduler, and RLC. O-DU 115 can be implemented on proprietary hardware or COTS (commercial over the shelf servers) and it can be on the cloud.

Programmable circuit 116A, which is an optional implementation of circuitry 116, includes a processor 117 and a memory 118. Processor 117 is an electronic device configured of logic circuitry that responds to and executes instructions. Memory 118 is a tangible, non-transitory, computer-readable storage device encoded with a computer program. In this regard, memory 118 stores data and instructions, i.e., program code, that are readable and executable by processor 117 for controlling operations of processor 117. Memory 118 may be implemented in a random access memory (RAM), a hard drive, a read only memory (ROM), or a combination thereof. One of the components of memory 118 is a program module, namely module 119. Module 119 contains instructions for controlling processor 117 to execute operations described herein on behalf of O-DU 115.

The term "module" is used herein to denote a functional operation that may be embodied either as a stand-alone component or as an integrated configuration of a plurality of subordinate components. Thus, each of module 109 and module 119 may be implemented as a single module or as a plurality of modules that operate in cooperation with one another.

While modules 109 and 119 are indicated as being already loaded into memories 108 and 118, respectively, either or both of modules 109 and 119 may be configured on a storage device 130 for subsequent loading into their respective memories 108 and 118. Storage device 130 is a tangible, non-transitory, computer-readable storage device that stores either or both of modules 109 and 119 thereon. Examples of storage device 130 include (a) a compact disk, (b) a magnetic tape, (c) a read only memory, (d) an optical storage medium, (e) a hard drive, (f) a memory unit consisting of multiple parallel hard drives, (g) a universal serial bus (USB) flash drive, (h) a random access memory, and (i) an electronic storage device coupled to O-RU 105 and/or O-DU 115 via a data communications network.

System 100 also includes an O-RU controller 125, M-plane interface 126, and an O1 interface 129. M-plane interface 126 is a communicative link between O-RU controller 125 and O-RU 105. O1 interface 129 is a communicative link between O-RU controller 125 and O-DU 115.

FH 110 is a connection link between O-DU 115 and O-RU 105 that carries control user synchronization (CUS)-plane packets as well as M-plane packets.

O-RU controller 125 is a controller that controls operations of O-RU 105 by exchanging M-plane messages with O-RU 105. O-RU 105 reports its capabilities to O-RU controller 125. Subsequently, O-RU controller 125 configures O-RU 105 to operate via M-plane. The exchange of M-plane messages between O-RU controller 125 and O-RU 105 can be accomplished by way of two possible paths, namely (1) via M-plane interface 126, or (2) via O1 interface 129, O-DU 115, and FH 110. Thus, O-RU 105 can report its capabilities to O-RU controller 125, and O-RU controller 125 can send management configuration data to O-RU 105, either (a) directly, via M-plane interface 126, in a hybrid M-plane architecture, or (b) indirectly, via O1 interface 129, O-DU 115 and FH 110, in a hierarchical architecture or hybrid architecture.

O-RU controller 125 includes electronic circuitry, namely circuitry 124, that performs operations on behalf of O-RU controller 125 to execute methods described herein. Circuity 124 may be implemented with any or all of (a) discrete electronic components, (b) firmware, and (c) a programmable circuit. Circuitry 124 may be implemented similarly to programmable circuit 116A, i.e., with a processor and a memory that contains instructions that are readable by the processor to control the processor to execute operations on behalf of O-RU controller 125.

Although O-RU controller 125 is shown as being a stand-alone device, as an alternative to being a stand-alone device, O-RU controller 125 can reside in either of O-DU 115 a service management and orchestration system (SMO) (not shown), or a network management system (NMS) (not shown).

The SMO is responsible for RAN domain management. The key capabilities of the SMO are:
  (a) FCAPS interface to O-RAN Network Functions;
  (b) Non-RT RIC for RAN optimization; and
  (c) O-Cloud Management, Orchestration and Workflow Management.

The SMO performs these services through four key interfaces to the O-RAN Elements:
  (i) A1 Interface between the Non-RT RIC in the SMO and the Near-RT RIC for RAN Optimization;
  (ii) O1 Interface between the SMO and the O-RAN Network Functions for FCAPS support;
  (iii) In the hybrid model, Open Fronthaul M-plane interface between SMO and O-RU for FCAPS support; and
  (iv) O2 Interface between the SMO and the O-Cloud to provide platform resources and workload management.

The NMS performs FCAP functions and interface for managing network elements.

The existing O-RAN specifications explain the exact method of sending the C-plane messages in the downlink (DL) direction and sending/receiving the U-plane messages between the O-DU and the O-RU. The main purpose of the C-plane messages is to transmit data-associated control information required for processing of user data (e.g., scheduling and beamforming commands). These messages are sent separately for DL related commands and UL related commands.

A common frame format is used for C-plane messages, consisting of a transport layer and an application layer. The application layer is within the transport layer payload and consists of a common header for time reference, followed by information and parameters dependent and specific to the Section Type in use. Multiple sets of section data of the same Section Type value can be lined up one after another within the payload. To minimize packet rate over the interface, a transmitter should fill messages with as many subsequent sections (with or without sequential section IDs) as possible.

To simplify the present description, the following sections of this document focus on a specific combining method (via sending real-time weights) which can be applied to specific section types (Section types 1 and 3) using section extension type 1 (as an example). However, this should not limit the scope of the present disclosure since the same methods or a variant of the methods described herein may be applied to other beamforming/combining methods.

Section Type 1 is used for most Downlink and Uplink radio channels. The fields of Section type 1 can be explained as follows:
Transport Layer
Application Layer
  Common Header Fields
    dataDirection (data direction (gNB Tx/Rx)) field: 1 bit
    payloadVersion (payload version) field: 3 bits
      value="1" shall be set (1st protocol version for payload and time reference format)
    filterIndex (filter index) field: 4 bits
    frameId (frame identifier) field: 8 bits
    subframeId (subframe identifier) field: 4 bits
    slotID (slot identifier) field: 6 bits
    startSymbolid (start symbol id) field: 6 bits
    numberOfsections (number of sections) field: 8 bits
    sectionType (section type) field: 8 bits
      value="1" shall be set
    udCompHdr (user data compression header) field: 8 bits 11
    reserved (reserved for future use) field: 8 bits
  Section Fields
    sectionId (section identifier) field: 12 bits
    rb (resource block identifier) field: 1 bit
    symInc (symbol number increment command) field: 1 bit
    startPrbc (starting PRB of data section description) field: 10 bits
    numPrbc (number of contiguous PRBs per data section description) field: 8 bits
    reMask (resource element mask) field: 12 bits
    numSymbol (number of symbols) field: 4 bits
    ef (extension flag) field: 1 bit
    beamId (beam identifier) field: 15 bits Beamforming/combining via sending real-time weights: In this method, O-DU 115 generates complex combining weights and sends these weights to O-RU 105 via FH 110.

The key aspects of the present disclosure can be summarized as follows:
  1) Non-delay managed C-plane/U-plane traffic:
    a. C-plane-based (real-time): Define a new section extension that informs O-RU 105 that the control information, e.g., beamforming weights, associated with this C-plane message are non-delay managed traffic. For example, the C-plane information may be spread across multiple symbols in advance and may arrive much earlier than the predefined Tcp_adv_dl value. Note that Tcp_adv_dl is defined as the smallest time advance to receive Downlink Data C-Plane message before the first IQ data can be processed. It also informs O-RU 105 that the C-plane message does not obey the transmit/receive window restrictions of control information. The advantage of this approach is the flexibility in marking C-plane messages as non-delay managed traffic.
    In the present disclosure, we define a real-time method (via C-plane: new section extension) that mark certain U-plane traffic as non-delay managed. This is useful in allowing O-DU 115 to activate/deactivate non-delay managed traffic in real-time, e.g., when detecting high-speed UEs. If this section extension is received, O-RU 105 will buffer the PUSCH symbols and wait for the combining matrix to be received before sending the PUSCH symbols to O-DU 115. The section extension will include the expected time offset for receiving the combining weights.

b. M-plane-based (non-real time): Using the M-plane, O-DU 115 informs O-RU 105 that certain C-plane section extensions, e.g., section extension type 11, will be non-delay managed. This can be used for static scenarios where O-DU 115 is sure that this control information will be non-delay managed for some time.

2) Multiple delay management profiles:

a. Define multiple delay management profiles in M-plane: A default profile that applies to all data. Other delay management profiles can be activated for specific RBs/symbols by using a new section extension sent via C-plane messages.

Non-Delay Managed C-Plane and U-Plane Traffic:

a. Indicate non-delay managed traffic in real-time using C-plane messages, i.e., new section extension:

Define a new section extension, which can be described as follow:

ExtType=12: Non-delay Managed C-plane and U-plane Traffic

This section extension can be applied to any Section Type.

This section extension enables O-DU 115 to mark specific C-plane and/or U-plane sections as non-delay managed traffic in real-time. In other words, this section extension allows O-DU 115 to specify the C-plane/U-plane reception windows that could be different from the specified delay management profile. This can be done by O-DU 115 by attaching the section extension towards the end of the C-plane section, where this message is needed. O-RU 105 can parse the C-plane packet and specifically the section extension to understand the timing of the C-plane and/or U-plane packets. This may help in several use cases. One case could be reducing the peak FH 110 throughput of sending beamforming weights to O-RU 105 in case of ZF precoding. Another use case is for enabling DMRS-based UL mMIMO processing for a large number of antennas. Enabling such capability gives O-DU 115 the flexibility to switch between different operation modes in real-time, e.g., SRS vs. DMRS-based UL mMIMO combining.

FIG. 2 is a table of Section Extension 12 Data Format.

Note that the section extension number could be any positive value from 12-127. The number 12 used above is just an example and this does not exclude the use of any other number within the specified range.

cEnable (C-Plane Non-Delay Managed Enable)

Description: When set, this parameter is used to mark the associated C-plane section as non-delay managed traffic. Two cases are considered:

Case 1: If O-DU 115 wants to send early C-plane parameters to O-RU 105, i.e., message will be received before the start of the receive window at O-RU 105, then O-DU 115 shall send the C-plane message, while including the required parameters, e.g., beamforming weights, in the desired early time, but it must also include Section extension type 12 in the same message. This message may arrive at O-RU 105 out of the receive window, and O-RU 105 shall not discard the C-plane message. cInd shall be zero. Case 1 is applicable to both UL and DL.

Case 2: If O-DU 115 wants to send late C-plane parameters to O-RU 105, i.e., message will be received after the end of the receive window at O-RU 105, then O-DU 115 shall send two C-plane messages. In each of these messages, O-DU 115 shall include Section extension 12. Case 2 is only applicable to UL.

Case 2.1: First C-plane message: "Indication message". This message shall arrive on time only to inform O-RU 105 that the actual C-plane information will be non-delay managed and will come late. This implicitly means that the actual control parameters, e.g., combining weights, are not included in the current message. Only Section extension 12 shall be included. Other control parameters, even if they do not need to be "non-delay managed", shall come later in the second C-plane message along with the actual "non-delay managed" C-plane. The cInd bit shall be set to one.

Case 2.2: Second C-plane message: This message is intended to arrive late, i.e., non-delay managed. Section extension 12 shall be included in addition to the actual control information, e.g., combining weights, and all other control parameters describing the underlying time/frequency resources. All fields in the corresponding section of the second C-plane message (e.g., beamId, startPrbc, numPrbc, etc.) shall be identical to the corresponding fields in the first C-plane message. The cInd bit shall be set to zero.

When cEnable is set to zero, O-DU 115 shall set the other fields related to C-plane to the default values. O-RU 105 shall ignore these parameters.

Value range: {0b=Non-delay managed marking is disabled; 1b=Enabled}.

Type: binary bit.

Field length: 1 bit.

Default Value: 0b (C-plane information obeys the regular delay management parameters)

cInd (C-plane Indication for Late Parameters)

Description: When set, this parameter is used as an indication to O-RU 105 that some C-plane parameters will arrive late, i.e., after the receive window. When set, the C-plane message must arrive on time complying with the receive window at O-RU 105.

For early C-plane messages (i.e., C-plane messages received by O-RU 105 earlier than the expected receive window based on the delay profile), then cInd shall always be zero. Thus, this is not an indication message, but instead, an actual early message that includes the early C-plane parameters.

If cEnable=0, O-RU 105 shall ignore the cInd bit, and O-DU 115 shall set the cInd bit to the default value.

Value range: {0b=Not an indication message, i.e., an early message or a late message that includes the control parameters; 1b=indication message that another C-plane message will arrive late}.

Type: binary bit.

Field length: 1 bit.

Default Value: 0b

C-planeDelayOffset (C-Plane Delay Offset)

Description: This parameter defines the delay offset in microseconds with respect to O-DU 115's transmit window. The benefit of this parameter is to inform O-RU 105 on when to expect the C-plane message. Two cases are considered:

Case 1: Early transmission: The C-planeDelayOffset is defined as the duration between the actual O-DU 115 transmission time and the start of O-DU 115's transmit window. In this case, the value of the C-planeDelayOffset is always negative.

Case 2.1: Indication message for late transmission: The C-planeDelayOffset is set to zero since the indication message is expected to be transmitted within O-DU 115's transmit window.

Case 2.2: Late transmission: The C-planeDelayOffset is defined as the duration between the actual O-DU 115 transmission time and the end of O-DU 115's transmit window. In this case, the value of the C-planeDelayOffset is always positive.

Figure 3:
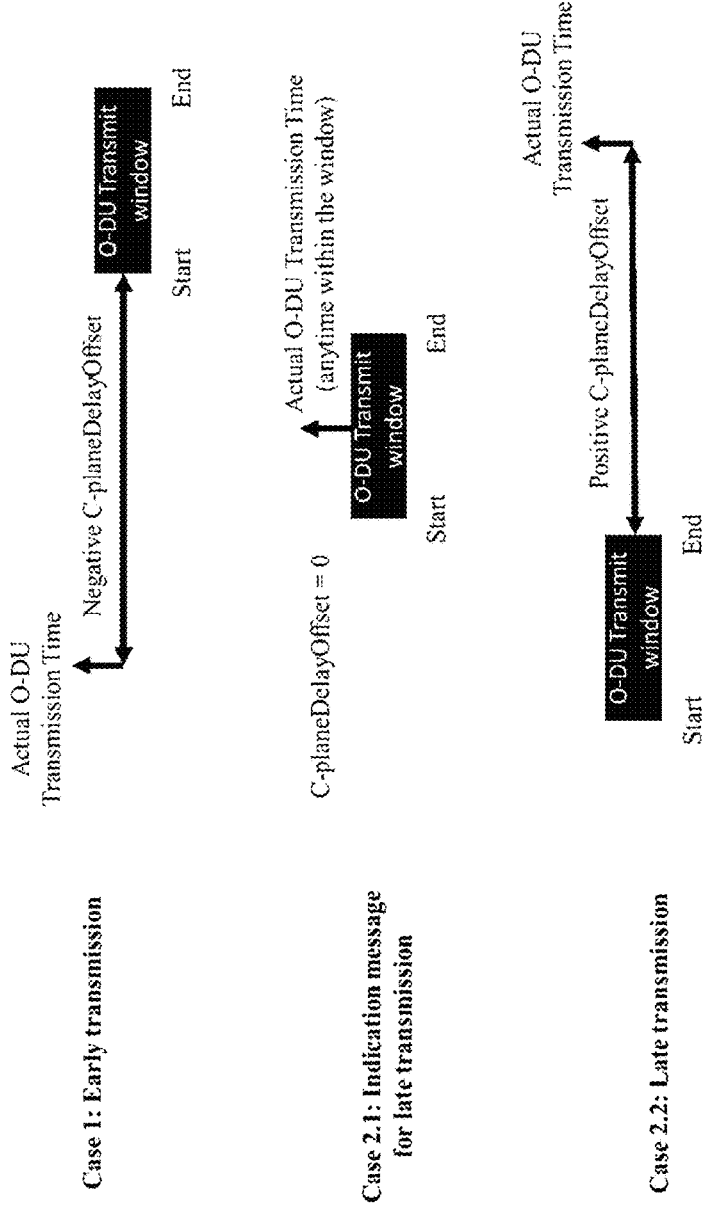
FIG. 3 is an illustration of C-planeDelayOffset (C-plane Delay Offset) in Section Extension 12.

FIG. 3 is an illustration of C-planeDelayOffset (C-plane Delay Offset) in Section Extension 12.

Value range: {0x0000=no offset,
  0x0001-0x1FFF=positive frequency offset,
  0x2000-0x3FFF=negative frequency offset}.
Type: signed integer.
Field length: 14 bits.
Default Value: All zeros.

Note that the number of assigned bits to this field, i.e., 14 bits, is one example. This does not exclude other options of allocating different number of bits for this field or any other field in this disclosure.

In another embodiment, O-RU 105 may report via the M-plane, its capability in terms of the supported window length. O-DU 115 shall only assign values for this field based on the reported capability.

uEnable (U-Plane Non-Delay Managed Enable)

Description: When set, this parameter is used to mark the associated U-plane section as non-delay managed traffic. Two cases are considered:

Case 1: If O-DU 115 wants to send early U-plane data to O-RU 105, i.e., message will be received before the start of the receive window at O-RU 105, then O-DU 115 shall send the corresponding C-plane message, while including the required parameters, e.g., beamforming weights, in the desired early time, but it must also include Section extension type 12 in the same message. This message may arrive at O-RU 105 out of the receive window, and O-RU 105 shall not discard the C-plane message. When the corresponding U-plane message is received, O-RU 105 shall buffer the U-plane until over-the-air transmission time. The uInd bit shall be set to zero. Case 1 is only applicable to DL.

Case 2: If O-DU 115 wants O-RU 105 to send late U-plane data to O-DU 115, i.e., U-plane message will be received after the end of the receive window at O-DU 115, then O-DU 115 shall send two C-plane messages. In each of these messages, O-DU 115 shall include Section extension 12. Case 2 is only applicable to UL.

Case 2.1: First C-plane message: "Indication message". This message shall arrive on time only to request O-RU 105 to delay the transmission of U-plane message(s). uInd bit shall be set to one.

Case 2.2: Second C-plane message: This message is intended to arrive late (i.e., non-delay managed). Section extension 12 shall be included in addition to the actual control information (e.g., combining weights) and all other control parameters describing the underlying time/frequency resources. Once received, O-RU 105 shall send the corresponding U-plane message(s). The uInd bit shall be set to zero.

When uEnable is set to zero, O-DU 115 shall set the other fields related to U-plane to the default values. O-RU 105 shall ignore these parameters.

Value range: {0b=Non-delay managed marking is disabled; 1b=Enabled}.
Type: binary bit.
Field length: 1 bit.
Default Value: 0b (U-plane information obeys the regular delay management parameters)

uInd (U-Plane Indication for Late Parameters)

Description: When set, this parameter is used as an indication to O-RU 105 that the uplink U-plane message(s) shall not be sent on time and that O-RU 105 shall wait for another C-plane message before sending the uplink U-plane data. When set, the C-plane message must arrive on time complying with the receive window at O-RU 105.

For early U-plane messages (i.e., U-plane messages received by O-RU 105 earlier than the expected receive window based on the delay profile), then uInd, in the corresponding C-plane message, shall always be zero.

For late U-plane messages, uInd shall be set to one in the on-time C-plane message and shall be set to zero in the late C-plane message preceding the transmission of the uplink U-plane data.

If cEnable=0, O-RU 105 shall ignore the cInd bit and O-DU 115 shall set the cInd bit to the default value.

Value range: {0b=Not an indication message, i.e., an early message or a late message which includes the control parameters; 1b=indication message that the U-plane data shall not be sent on time}.
Type: binary bit.
Field length: 1 bit.
Default Value: 0b U-PlaneDelayOffset (U-Plane Delay Offset)

Figure 4:
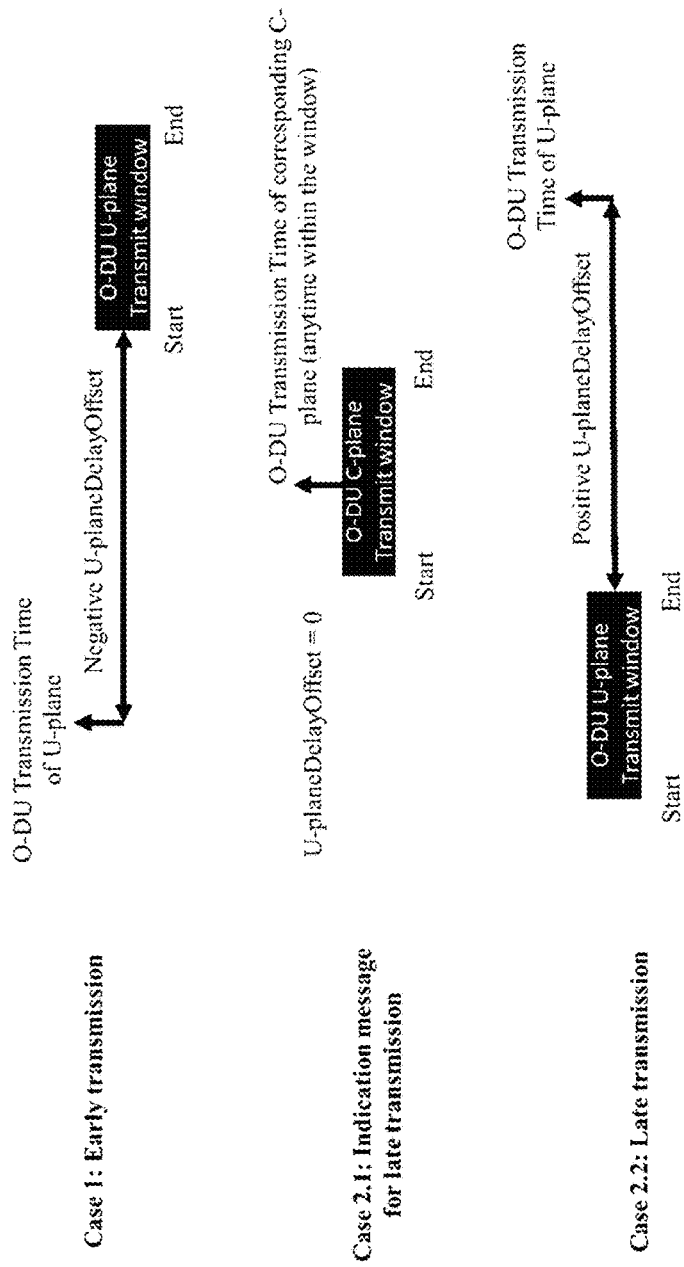
FIG. 4 is an illustration of U-planeDelayOffset (U-plane Delay Offset) in Section Extension 12.

Description: FIG. 4 is an illustration of U-planeDelayOffset (U-plane Delay Offset) in Section Extension 12. This parameter defines the delay offset in microseconds with respect to O-DU 115/O-RU 105 transmit window. Two cases are considered:

Case 1: Early transmission: The U-planeDelayOffset is defined as the duration between O-DU 115's transmission time and the start of O-DU 115's U-plane transmit window. In this case, the value of the U-planeDelayOffset is always negative.

Case 2.1: Indication message for late transmission: The U-planeDelayOffset is set to zero since the indication message is expected to be transmitted within O-DU 115's C-plane transmit window.

Case 2.2: Late transmission: The U-planeDelayOffset is defined as the duration between O-RU 105's "desired" transmission time and the end of O-RU 105's transmit window. In this case, the value of the C-planeDelayOffset is always positive.

Value range: {0x0000=no offset,
  0x0001-0x1FFF=positive frequency offset,
  0x2000-0x3FFF=negative frequency offset}.
Type: signed integer.
Field length: 14 bits.
Default Value: All zeros.

Note that the number of assigned bits to this field, i.e., 14 bits, is one example. This does not exclude other options of allocating different number of bits for this field or any other field in this disclosure.

In another embodiment, O-RU 105 may report via the M-plane, its capability in terms of the supported window length. O-DU 115 shall only assign values for this field based on the reported capability.

In another embodiment, two section extensions are defined: One for the U-plane and another one for the C-plane.

The C-plane section extension is used to inform O-RU 105 that the associated C-plane information is non-delay managed or can have different delay parameters than the default delay profile.

FIG. 5 is another embodiment of Section Extension 12 Data Format, where only the C-plane related parameters are included in the section extension.

FIG. 5 shows fields that can be used in a similar manner as described above to inform O-RU 105 about the used delay/offset.

The U-plane section extension is used to inform O-RU 105 that the referred U-plane information is non-delay managed.

FIG. 6 is another embodiment of Section Extension 12 Data Format, where only the U-plane related parameters are included in the section extension.

FIG. 6 shows fields that can be used in a similar manner as described above to inform O-RU 105 about the used delay/offset.

FIG. 7 is another embodiment of Section Extension 12 Data Format, where the cInd and uInd bits may not be included and O-RU 105 can implicitly understand whether this message is an indication or not based on the sign of the C-planeDelayOffset or U-planeDelayOffset.

Note that the section extension number could be any positive value from 12-127. The number 12 used above is just an example and this does not exclude the use of any other number within the specified range.

cEnable (C-Plane Non-Delay Managed Enable)

Description: When set, this parameter is used to mark the associated C-plane section as non-delay managed traffic. Two cases are considered:

Case 1: If O-DU 115 wants to send early C-plane parameters to O-RU 105, i.e., message will be received before the start of the receive window at O-RU 105, then O-DU 115 shall send the C-plane message, while including the required parameters, e.g., beamforming weights, in the desired early time, but it must also include Section extension type 12 in the same message. This message may arrive at O-RU 105 out of the receive window, and O-RU 105 shall not discard the C-plane message. Case 1 is applicable to both UL and DL.

Case 2: If O-DU 115 wants to send late C-plane parameters to O-RU 105, i.e., message will be received after the end of the receive window at O-RU 105, then O-DU 115 shall send two C-plane messages. In each of these messages, O-DU 115 shall include Section extension 12. Case 2 is only applicable to UL.

Case 2.1: First C-plane message: "Indication message". This message shall arrive on time only to inform O-RU 105 that the actual C-plane information will be non-delay managed and will come late. This implicitly means that the actual control parameters, e.g., combining weights, are not included in the current message. Only Section extension 12 shall be included. Other control parameters, even if they do not need to be "non-delay managed", shall come later in the second C-plane message along with the actual "non-delay managed" C-plane.

Case 2.2: Second C-plane message: This message is intended to arrive late, i.e., non-delay managed. Section extension 12 shall be included in addition to the actual control information, e.g., combining weights, and all other control parameters describing the underlying time/frequency resources. All fields in the corresponding section of the second C-plane message (e.g., beamId, startPrbc, numPrbc, etc.) shall be identical to the corresponding fields in the first C-plane message.

When cEnable is set to zero, O-DU 115 shall set the other fields related to C-plane to the default values. O-RU 105 shall ignore these parameters.

Value range: {0b=Non-delay managed marking is disabled; 1b=Enabled}.

Type: binary bit.

Field length: 1 bit.

Default Value: 0b (C-plane information obeys the regular delay management parameters)

C-planeDelayOffset (C-Plane Delay Offset)

Description: This parameter defines the delay offset in microseconds with respect to O-DU 115 transmit window. Two cases are considered:

Case 1: Early transmission: The C-planeDelayOffset is defined as the duration between O-DU 115's actual transmission time and the start of O-DU 115's transmit window. In this case, the value of the C-planeDelayOffset is always negative.

Case 2.1: Indication message for late transmission: The C-planeDelayOffset is set to zero since the indication message is expected to be transmitted within O-DU 115's transmit window.

Case 2.2: Late transmission: The C-planeDelayOffset is defined as the duration between O-DU 115's actual transmission time and the end of O-DU 115's transmit window. In this case, the value of the C-planeDelayOffset is always positive.

Value range: {0x0000=no offset,
  0x0001-0x1FFF=positive frequency offset,
  0x2000-0x3FFF=negative frequency offset}.

Type: signed integer.

Field length: 14 bits.

Default Value: All zeros.

Note that the number of assigned bits to this field, i.e., 14 bits, is one example. This does not exclude other options of allocating different number of bits for this field or any other field in this disclosure.

In another embodiment, O-RU 105 may report via the M-plane, its capability in terms of the supported window length. O-DU 115 shall only assign values for this field based on the reported capability.

uEnable (U-Plane Non-Delay Managed Enable)

Description: When set, this parameter is used to mark the associated U-plane section as non-delay managed traffic. Two cases are considered:

Case 1: If O-DU 115 wants to send early U-plane data to O-RU 105, i.e., message will be received before the start of the receive window at O-RU 105, then O-DU 115 shall send the corresponding C-plane message, while including the required parameters, e.g., beamforming weights, in the desired early time, but it must also include Section extension type 12 in the same message. This message may arrive at O-RU 105 out of the receive window and O-RU 105 shall not discard the C-plane message. When the corresponding U-plane message is received, O-RU 105 shall buffer the U-plane until over-the-air transmission time. Case 1 is only applicable to DL.

Case 2: If O-DU 115 wants O-RU 105 to send late U-plane data to O-DU 115, (i.e., U-plane message will be received after the end of the receive window at O-DU 115, then O-DU 115 shall send two C-plane messages. In each of these messages, O-DU 115 shall include Section extension 12. Case 2 is only applicable to UL.

Case 2.1: First C-plane message: "Indication message". This message shall arrive on time only to request O-RU 105 to delay the transmission of U-plane message(s).

Case 2.2: Second C-plane message: This message is intended to arrive late (i.e., non-delay managed). Section extension 12 shall be included in addition to the actual control information (e.g., combining weights) and all other control parameters describing the underlying time/frequency resources. Once received, O-RU 105 shall send the corresponding U-plane message(s).

When uEnable is set to zero, O-DU 115 shall set the other fields related to U-plane to the default values. O-RU 105 shall ignore these parameters.

Value range: {0b=Non-delay managed marking is disabled; 1b=Enabled}.
Type: binary bit.
Field length: 1 bit.
Default Value: 0b (U-plane information obeys the regular delay management parameters)

U-planeDelayOffset (U-Plane Delay Offset)

Description: This parameter defines the delay offset in microseconds with respect to O-DU 115/O-RU 105 transmit window. Two cases are considered:

Case 1: Early transmission: The U-planeDelayOffset is defined as the duration between O-DU 115's transmission time and the start of O-DU 115's U-plane transmit window. In this case, the value of the U-planeDelayOffset is always negative.

Case 2.1: Indication message for late transmission: The U-planeDelayOffset is set to zero since the indication message is expected to be transmitted within O-DU 115's C-plane transmit window.

Case 2.2: Late transmission: The U-planeDelayOffset is defined as the duration between O-RU 105's "desired" transmission time and the end of O-RU 105's transmit window. In this case, the value of the C-planeDelayOffset is always positive.

Value range: {0x0000=no offset,
0x0001-0x1FFF=positive frequency offset,
0x2000-0x3FFF=negative frequency offset}.
Type: signed integer.
Field length: 14 bits.
Default Value: All zeros.

Note that the number of assigned bits to this field, i.e., 14 bits, is one example. This does not exclude other options of allocating different number of bits for this field or any other field in this disclosure.

In another embodiment, O-RU 105 may report via the M-plane, its capability in terms of the supported window length. O-DU 115 shall only assign values for this field based on the reported capability.

FIG. 8 is another Embodiment of Section Extension 12 Data Format, where the window length is included in the section extension.

Note that the section extension number could be any positive value from 12-127. The number 12 used above is just an example and this does not exclude the use of any other number within the specified range.

In this embodiment, it is implicitly understood that the C-plane and U-plane transmit/receive window length may be different.

cEnable cInd, uEnable, and uInd are defined as described above. The remaining parameters are described as below:

windowLength/C-planeDelayOffset (Window Length/C-Plane Delay Offset)

Description: This parameter can refer to one of two parameters based on the cInd bit:

Case 1: Early transmission: In this case, the parameter refers to the windowLength in microseconds. O-DU 115 uses this parameter to denote the duration of the transmit/receive window starting from the first message in the early transmission window. cInd shall be set to zero.

Case 2.1: Indication message for late transmission: In this case, the parameter refers to the C-planeDelayOffset in microseconds. O-DU 115 uses this parameter to inform O-RU 105 about the delay offset from the end of the original transmit window to the start of the new transmit window. cInd shall be set to one.

Case 2.2: Late transmission: In this case, the parameter refers to the windowLength in microseconds. O-DU 115 uses this parameter to denote the duration of the transmit/receive window starting from the first message in the late transmission window. cInd shall be set to zero.

Figure 9:
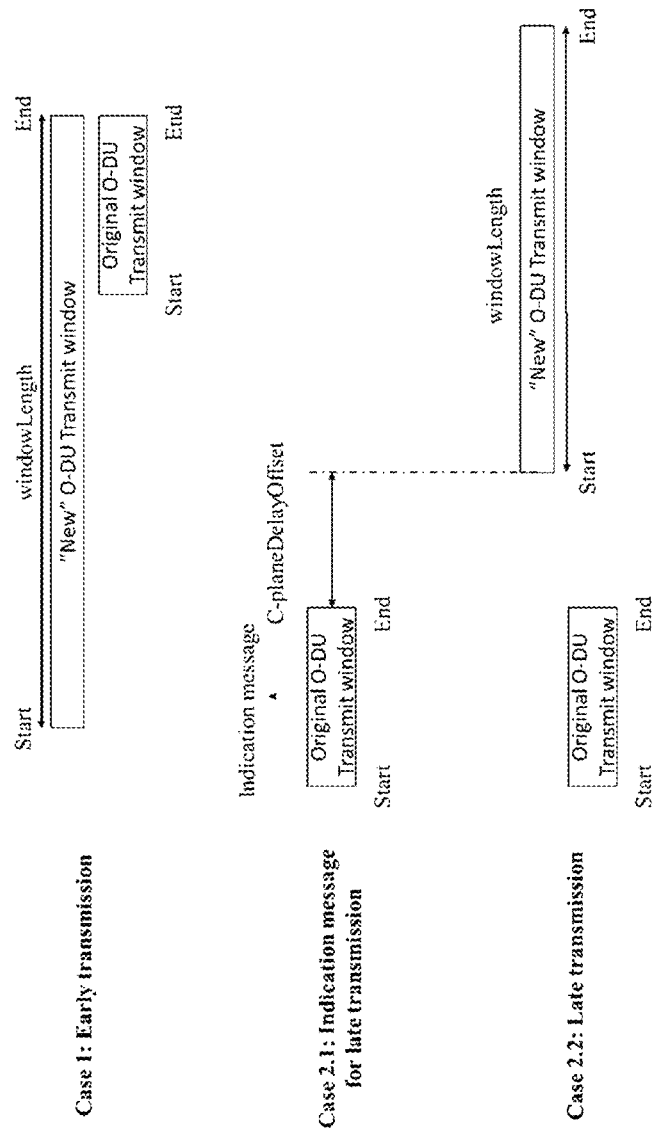
FIG. 9 is an illustration of windowLength/C-PlaneDelay-Offset in Section Extension 12.

FIG. 9 is an illustration of windowLength/C-PlaneDelayOffset in Section Extension 12.

Value range: {All zeros-All ones}.
Type: unsigned integer.
Field length: 14 bits.
Default Value: All zeros.

Note that the number of assigned bits to this field, i.e., 14 bits, is one example. This does not exclude other options of allocating different number of bits for this field or any other field in this disclosure.

In another embodiment, O-RU 105 may report via the M-plane, its capability in terms of the supported window length. O-DU 115 shall only assign values for this field based on the reported capability.

In another embodiment, the fields windowLength and C-planeDelayOffset can be decoupled and included in two separate sets of bits. In this case, only one field, either windowLength or C-planeDelayOffset, can be used at a time.

windowLength/U-planeDelayOffset (Window Length/U-Plane Delay Offset)

Description: This parameter can refer to one of two parameters based on the uInd bit:

Case 1: Early transmission: In this case, the parameter refers to the windowLength in microseconds. O-DU 115 uses this parameter to denote the duration of the transmit/receive window starting from the first message in the early transmission window. uInd shall be set to zero.

Case 2.1: Indication message for late transmission: In this case, the parameter refers to the U-planeDelayOffset in microseconds. O-DU 115 uses this parameter to inform O-RU 105 about the delay offset from the end of the original transmit window to the start of the new transmit window. uInd shall be set to one.

Case 2.2: Late transmission: In this case, the parameter refers to the windowLength in microseconds. O-DU 115 uses this parameter to denote the duration of the transmit/receive window starting from the first message in the late transmission window. uInd shall be set to zero.

Figure 10:
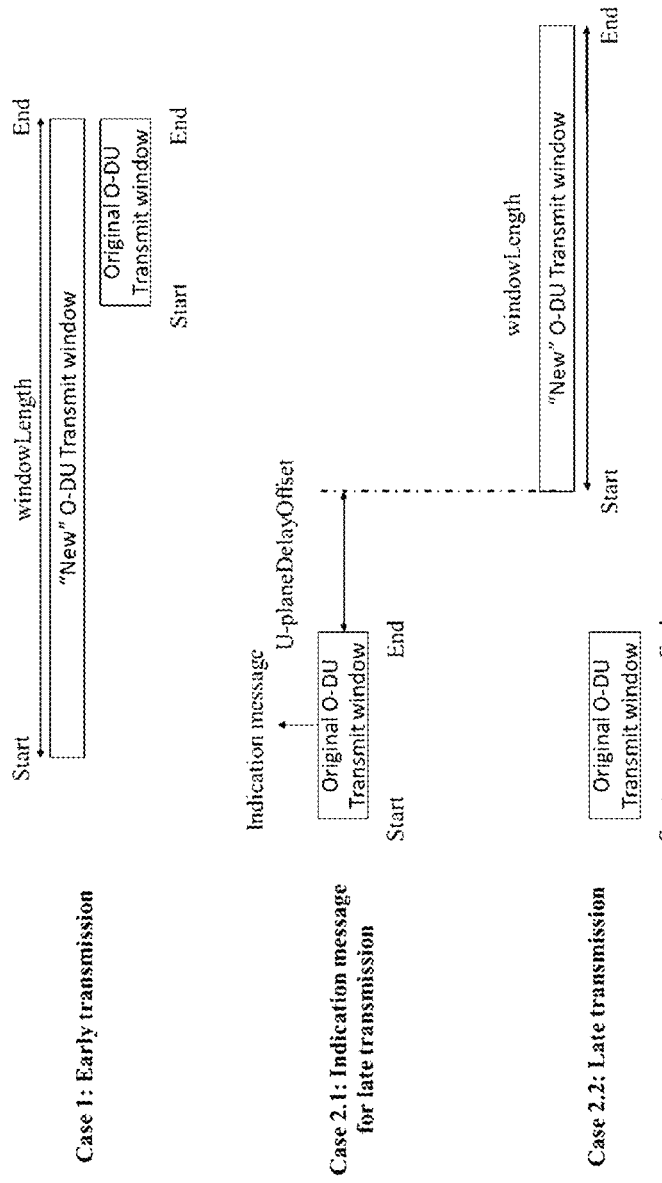
FIG. 10 is an illustration of windowLength/U-planeDelayOffset in Section Extension 12.

FIG. 10 is an illustration of windowLength/U-planeDelayOffset in Section Extension 12.

Value range: {All zeros-All ones}.
Type: unsigned integer.
Field length: 14 bits.
Default Value: All zeros.

Note that the number of assigned bits to this field, i.e., 14 bits, is one example. This does not exclude other options of allocating different number of bits for this field or any other field in this disclosure.

In another embodiment, O-RU 105 may report via the M-plane, its capability in terms of the supported window length. O-DU 115 shall only assign values for this field based on the reported capability.

In another embodiment, the fields windowLength and U-planeDelayOffset can be decoupled and included in two separate set of bits. In this case, only one field, either windowLength or U-planeDelayOffset, can be used at a time.

In another embodiment, two section extensions are defined: One for the U-plane and another one for the C-plane.

The C-plane section extension is used to inform O-RU 105 that the associated C-plane information is non-delay managed.

FIG. 11 is another embodiment of Section Extension 12 Data Format, where only the C-plane related parameters are included in the section extension.

FIG. 11 shows fields that can be used in a similar manner as described above to inform O-RU 105 about the used window or delay/offset.

Note that, in another embodiment, the fields windowLength and C-planeDelayOffset can be decoupled and included in two separate set of bits. In this case, only one field, either windowLength or C-planeDelayOffset, can be used at a time.

The U-plane section extension is used to inform O-RU 105 that the referred U-plane information is non-delay managed.

FIG. 12 is another embodiment of Section Extension 12 Data Format, where only the U-plane related parameters are included in the section extension.

FIG. 12 shows fields that can be used in a similar manner as described above to inform O-RU 105 about the used window or delay/offset.

Note that, in another embodiment, the fields windowLength and U-planeDelayOffset can be decoupled and included in two separate set of bits. In this case, only one field, either windowLength or U-planeDelayOffset, can be used at a time.

Note that WindowLength/C-planeDelayOffset and/or WindowLength/U-planeDelayOffset may have different number of bits, i.e., 14 bits is just an example. Few bits can be left as reserved for future usage.

Indicate Non-Delay Managed Traffic Using M-Plane (Static Indication)

In one embodiment, using the M-plane, O-DU 115 informs O-RU 105 that certain C-plane section extensions, e.g., section extension type 1 or 11, will be non-delay managed. This can be used for static scenarios where O-DU 115 is sure that this control information will be non-delay managed for some time.

In another embodiment, using the M-plane, O-DU 115 links certain section extensions in the C-plane to delay management profiles, other than the default one, using the delay management profile ID. See next section for details on defining multiple profiles.

In this case, only the C-plane related parameters in the delay management profile will be applicable to the section extension. The U-plane data timing may not be linked to the C-plane timing.

In another embodiment, by definition, certain section extensions are linked to specific delay management profiles.

As an example, Section extension 11 is linked to a specific delay management profile ID.

In another embodiment, certain U-plane traffic, e.g., SRS, can be linked to delay management profile ID, other than the default one. This can be done by linking specific eAxC IDs to specific delay management profile IDs. In this case, certain U-plane traffic flows will not only be marked as non-delay managed, but these flows will also be linked to certain profiles to help O-DU 115/O-RU 105 expect the transmission/reception time.

In another embodiment, only the related delay management parameters may be defined, not the whole profile, for the specific section extensions or U-plane traffic flows, via eAxC IDs, that are not following the default profile.

2) Define multiple delay management profiles/parameters:
 a. Define multiple profiles and Define a new section extension to indicate which profile to use.
  Define multiple delay management profiles in M-plane.
   O-RU 105 shall report in its capabilities whether it can support this feature or not, i.e., the multiple delay management profiles feature.
   If yes, O-RU 105 shall report the number of delay management profiles that it can support.
   The total number of delay management profiles shall be predefined, e.g., a total of 16 profiles. However, the default profile will be the one currently defined in the O-RAN specifications. Hence, O-RU 105 can support an additional of, for example, 15 profiles.
   O-DU 115 and O-RU 105 shall exchange all the delay management parameters via M-plane for each profile.
   Each profile shall be given a delay management profile ID.
   There could be multiple delay management profiles defined per each bandwidth and subcarrier spacing combination.
   The first profile with delay management profile ID=0000b is the default profile that applies to all data by default and does not require special control message to trigger/indicate.
   O-DU 115 may trigger/indicate any other delay management profile for certain time/frequency resources by using Section extension 13 and by including the delay management profile ID.
   Once received, O-RU 105 shall consider the indicated delay management profile for the corresponding time/frequency resources indicated by the C-plane message.
   Using the information, i.e., ucActivate field, in the section extension, O-RU 105 shall determine whether the new delay management profile, identified by the delayMngmtProfileID, is activated for the C-plane, U-plane, or both planes.
  Define a new section extension, which can be described as follow:
 ExtType=13: Delay Management Profile Indication
  This section extension can be applied to any Section Type.
  This section extension enables O-DU 115 to link specific C-plane and/or U-plane sections to delay management profiles (other than the default profile) specified via the M-plane. For all C-plane/U-plane sections following the default delay management profile, there is no need to use this section extension.

Thus, O-DU 115 sends to O-RU 105, a control-plane message that contains a section extension that defines a timing configuration, and O-RU 105 sends to O-DU 115, user-plane traffic in a specific time window based on the timing configuration. The timing configuration includes a parameter such as a transmission window size, and/or a transmission window delay offset.

O-RU 105 reports to O-RU controller 125, via a management-plane, window sizes that are supported by O-RU 105. O-RU controller 125 selects a window size from among the window sizes, thus yielding a selected window size, and forwards the selected window size to O-DU 115. O-DU 115 prepares the control-plane message based on the selected window size.

FIG. 13 is a table of Section Extension 13 Data Format.

Note that the section extension number could be any positive value from 12-127. The number 13 used above is just an example, and this does not exclude the use of any other number within the specified range.

delayMngmtProfileID (Delay Management Profile Identifier)

Description: This parameter defines the delay management profile ID. O-DU 115 uses this field to inform O-RU 105 that the associated C-plane section and/or the corresponding U-plane data follow the delay management profile specified by the delayMngmtProfileID, which shall be different from the default delayMngmtProfileID.

Value range: {0000b-1111b}.
Type: Unsigned integer.
Field length: 4 bits.
Default Value: 0000b.

ucActivate (U-Plane/C-Plane Activate)

Description: This parameter activates the plane (C-plane and/or U-plane) that is linked to the delayMngmtProfileID. Three cases are considered:

01b: The delay management profile identified by delayMngmtProfileID is activated for the C-plane section associated with this section extension.

10b: The delay management profile is activated for the U-plane section referred by the associated C-plane section.

11b: Both C-plane and U-plane sections are activated.

Note that for the first two cases (ucActivate=01b or 10b): It is implicitly understood that the C-plane and U-plane transmit/receive window length may be different. Using this field, O-DU 115 can, for example, link the U-plane data to one profile, while link the C-plane sections to another profile.

Value range: {00b: reserved, 01b: C-plane, 10b: U-plane, 11b: Both C-plane and U-plane}.
Type: Unsigned integer.
Field length: 4 bits.
Default Value: 0000b.

Thus, O-RU controller 125 configures O-RU 105 and O-DU 115 to have (a) transmission and reception windows of a first duration for a control-plane message, and (b) transmission and reception windows of a second duration for a user-plane message, wherein the second duration is different than the first duration. O-DU 115 sends the control-plane message to O-RU 105 in a window having the first duration, and sends the user-plane message to O-RU 105 in a window having the second duration.

FIG. 14 is another embodiment of Section Extension 13 Data Format, where the ucActivate field in Section Extension 13 may not exist. By default, O-RU 105 shall apply the indicated delay management profile ID to both C-plane and U-plane. In another embodiment, the default can be set to C-plane only or U-plane only.

ExtType=13: Delay Management Profile Indication (Another Embodiment)

Note that the section extension number could be any positive value from 12-127. The number 13 used above is just an example and this does not exclude the use of any other number within the specified range.

This section extension can be applied to any Section Type.

This section extension enables O-DU 115 to link specific C-plane and/or U-plane sections to delay management profiles, other than the default profile, specified via the M-plane. For all C-plane/U-plane sections following the default delay management profile, there is no need to use this section extension.

Note that the section extension number could be any positive value from 12-127. The number 13 used above is just an example and this does not exclude the use of any other number within the specified range.

delayMngmtProfileID (Delay Management Profile Identifier)

Description: This parameter defines the delay management profile ID. O-DU 115 uses this field to inform O-RU 105 that the associated C-plane section and/or the corresponding U-plane data follow the delay management profile specified by the delayMngmtProfileID, which shall be different from the default delayMngmtProfileID.

Value range: {0000b-1111b}.
Type: Unsigned integer.
Field length: 4 bits.
Default Value: 0000b.

Thus, in system 100, O-RU 105 sends, to O-RU controller 125, (i) a message informing that O-RU 105 supports a feature such as (a) a plurality of delay management profiles, and/or (b) a plurality of transmission window sizes, and (ii) a report of capabilities of O-RU 105, wherein the report includes a parameter such as (a) a quantity of supported delay management profiles, (b) supported window sizes for each of the plurality of delay management profiles, and/or (c) a supported window offset for each of the plurality of delay management profiles. O-RU controller 125 configures O-RU 105 based on the feature and the parameter.

In this regard, O-RU 105 includes circuitry 106, which is adapted to perform operations of:

sending, to O-RU controller 125, (i) a message informing that O-RU 105 supports a feature such as (a) a plurality of delay management profiles, and/or (b) a plurality of transmission window sizes, and (ii) a report of capabilities of O-RU 105, wherein the report includes a parameter such as (a) a quantity of supported delay management profiles, (b) supported window sizes for each of the plurality of delay management profiles, and/or (c) a supported window offset for each of the plurality of delay management profiles;

receiving from O-RU controller 125, configuration data based on the feature and the parameter; and operating O-RU 105 in accordance with the configuration data.

Additionally, O-RU controller 125 includes circuitry 124, which is adapted to perform operations of:

receiving, from O-RU 105, (i) a message informing that O-RU 105 supports a feature such as (a) a plurality of delay management profiles, and/or (b) a plurality of transmission window sizes, and (ii) a report of capabilities of O-RU 105, wherein the report includes a parameter such as (a) a quantity of supported delay management profiles, (b) supported window sizes for each of the plurality of delay management profiles, and/or (c) a supported window offset for each of the plurality of delay management profiles; and configuring O-RU 105 based on the feature and the parameter.

Each of the plurality of delay management profiles is defined in terms of a bandwidth and subcarrier spacing, and given a delay management profile identification (see FIG. 14).

O-DU 115 sends, to O-RU 105, in a C-plane message, a section extension that includes a delay management profile identification (ID) that identifies a delay management profile to be used for a U-plane resource (see FIG. 14). The delay management profile ID refers to delay parameters of a C-plane message (see FIG. 13).

O-DU 115 sends, to O-RU 105, in a C-plane message, a section extension that indicates a transmit window and a delay offset to be used for a time/frequency resource (see FIG. 12).

O-RU controller 125 statically (i.e., fixed assignment with no real-time change) links, via an M-plane interface, a delay management profile in the plurality of delay management profiles, to U-plane traffic and/or C-plane traffic.

O-RU controller 125 configures O-RU 105, via an M-plane interface, with a window size from the supported set of window sizes, and a window offset from the supported window offsets, for U-plane traffic and/or C-plane traffic.

O-RU controller 125 configures O-RU 105 via an M-plane interface by marking C-plane traffic as non-delay managed traffic.

Beneficially, system 100 enables O-DU 115 to control DL and UL traffic timing at O-RU 105 for cases where timing cannot be aligned with the default delay management profile. This can help in reducing FH 110 throughput by decoupling the C-plane and U-plane delay parameters, which allows O-DU 115 to spread the transmission of the beamforming weights across time. System 100 also enables O-RU 105 to define the window for U-plane UL transmission such as SRS via M-plane and C-plane to help O-DU 115 prepare for the received packets. System 100 provides other methods to help O-DU 115 have full control in real-time or in a static mode on the timing of the C-plane and U-plane packets.

The techniques described herein are exemplary, and should not be construed as implying any particular limitation on the present disclosure. It should be understood that various alternatives, combinations and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof. The terms "a" and "an" are indefinite articles, and as such, do not preclude embodiments having pluralities of articles.

GLOSSARY OF TERMS

3GPP Third generation partnership project
A1 Interface between Non-RT RIC in an SMO and Near-RT RIC for RAN Optimization
CAPEX Capital Expenditure
CBRS Citizens Broadband Radio Services
CC Component Carrier
COTS Commercial Off-The-Shelf
CP Cyclic Prefix
C-plane Control plane
C-RAN Cloud Radio Access Network
DCI Downlink Control Indicator
DL Downlink
DMRS Demodulation Reference Signals
DU Distribution Unit
eAxC ID Extended Antenna-Carrier Identifier: a data flow for a single antenna (or spatial stream) for a single carrier in a single sector
eNB Evolved Node B
FCAPS Fault, Configuration, Accounting, Performance, Security
FDD Frequency-Division Duplex
FEC Forward Error Correction
FH Fronthaul
FFT Fast Fourier Transform
iFFT Inverse Fast Fourier Transform
IQ In-phase/Quadrature-phase
HARQ Hybrid Automatic Repeat Request
LPHY Lower Physical Layer
LTE Long-Term Evolution
LTE-A LTE Advanced
M-plane Management Plane
MCS Modulation and Coding Scheme
MIMO Multiple Input, Multiple Output
MMSE-IRC Minimum Mean Square Error—Interference Rejection Combining
MMSE-MRC Minimum Mean Square Error—Maximum-Ratio Combining
mmWave Millimeter Wave
MNO Mobile Network Operator
Near RT RIC Near-Real-Time RAN Intelligent Controller
Non-RT RIC O-RAN Non-Real-Time RAN Intelligent Controller
NR New Radio
O1 Interface between SMO framework specified in O-RAN Architecture and O-RAN managed elements, for operation and management, by which FCAPS management, PNF software management, and file management are achieved
O2 Interface between SMO framework as specified in O-RAN architecture and the O-Cloud for supporting O-RAN virtual network functions
O-Cloud A cloud computing platform that includes a collection of physical infrastructure nodes that meet O-RAN requirements to host relevant O-RAN functions (such as Near-RT RIC, O-CU-CP, O-CU-UP, and O-DU), supporting software components (such as Operating System, Virtual Machine Monitor, and Container Runtime), and management and orchestration functions
O-CU O-RAN Centralized Unit
O-RAN Open RAN
OAM Operation and Management
OPEX Operating Expense
PBCH Physical Broadcast Channel
PCFICH Physical Control Format Indicator Channel
PDCCH Physical Downlink Control Channel
PDCP Packet Data Convergence Protocol
PDSCH Physical Downlink Shared Channel
PHICH Physical Hybrid ARQ Indicator Channel
PHY Physical Layer
PNF Physical Network Function
U-Plane User Plane UPHY Upper Physical Layer
PUCCH Physical Uplink Control Channel
PUSCH Physical Uplink Shared Channel
QAM Quadrature Amplitude Modulation
QPSK Quadrature Phase Shift Keying
RACH Random Access Channel
PRACH Physical Random-Access Channel
RF Radio Frequency
RLC Radio Link Control
RRC Radio Resource Control
RRM Radio Resource Management
RRH Remote Radio Head
RRU Remote Radio Unit
RU Radio Unit
RS Reference Signal
RSSI Received Signal Strength Indicator
S-plane Synchronization Plane
SCell Secondary Cell
SDAP Service Data Adaptation Protocol
SIMO Single Input, Multiple Output
SINR Signal-to-Interference-plus-Noise Ratio
SMO Service Management and Orchestration
SRS Sounding Reference Signal
SSS Secondary Synchronization Signal
TB Transport Block
TTI Transmission Time Interval
TDD Time Division Duplex
TRP Transmission Reception Point
U-plane User Plane
UCI Uplink Control Information
UE User Equipment
UL Uplink
UL DMRS Uplink Demodulation Reference Signal
ULSCH Uplink Shared Channel
vBBU Virtualized Baseband Unit
VNF Virtual Network Function
ZF Zero-Forcing

What is claimed is:

1. A method of operating an Open Radio Access Network (O-RAN) having an O-RAN radio unit (O-RU) and an O-RU controller, comprising:
    sending, from said O-RU to said O-RU controller, a message informing that said O-RU supports features including (a) a plurality of delay management profiles, and (b) a plurality of transmission window sizes; and
    sending, from said O-RU to said O-RU controller, a report of capabilities of said O-RU, wherein said report comprises parameters including (a) a quantity of supported delay management profiles, (b) supported window sizes for each of said plurality of delay management profiles, and (c) a supported window offset for each of said plurality of delay management profiles;
    wherein said O-RU controller configures said O-RU based on said features and said parameters;
    wherein each of said plurality of delay management profiles is defined in terms of a subcarrier spacing (SCS) and a bandwidth (BW).

2. The method of claim 1, wherein each of said plurality of delay management profiles is given a delay management profile identification.

3. The method of claim 1, wherein said O-RAN also includes an O-RAN distributed unit (O-DU), and said method further comprises:
    sending, from said O-DU to said O-RU, in a control-plane message, a section extension that includes a delay management profile identification (ID) that identifies a delay management profile to be used for a user-plane resource.

4. The method of claim 3, wherein said delay management profile ID refers to delay parameters of a control-plane message.

5. The method of claim 1, wherein said O-RAN also includes an O-RAN distributed unit (O-DU), and said method further comprises:
    sending, from said O-DU to said O-RU, in a control-plane message, a section extension that indicates a transmit window and a delay offset to be used for a time/frequency resource.

6. The method of claim 1, wherein said O-RU controller statically links, via a management-plane interface, a delay management profile in said plurality of delay management profiles, to traffic selected from the group consisting of user-plane traffic and control-plane traffic.

7. The method of claim 1, wherein said O-RU controller configures said O-RU, via a management-plane interface, with a window size from said supported set of window sizes, and a window offset from said supported window offsets, for traffic selected from the group consisting of user-plane traffic and control-plane traffic.

8. The method of claim 1, wherein said O-RU controller configures said O-RU via a management-plane interface by marking control-plane traffic as non-delay managed traffic.

9. The method of claim 1,
    wherein said O-RU controller resides in a service management and orchestration system (SMO), and
    wherein said O-RU controller configures said O-RU in communications conducted between said O-RU controller and said O-RU via a management-plane interface.

10. An Open Radio Access Network Radio Unit (O-RU) comprising electronic circuity adapted to perform operations of:
    sending to an O-RU controller in an Open Radio Access Network (O-RAN), a message informing that said O-RU supports features including (a) a plurality of delay management profiles, and (b) a plurality of transmission window sizes;
    sending to said O-RU controller, a report of capabilities of said O-RU, wherein said report comprises parameters including (a) a quantity of supported delay management profiles, (b) supported window sizes for each of said plurality of delay management profiles, and (c) a supported window offset for each of said plurality of delay management profiles;
    receiving from said O-RU controller, configuration data based on said features and said parameters; and
    operating said O-RU in accordance with said configuration data,
    wherein each of said plurality of delay management profiles is defined in terms of a subcarrier spacing (SCS) and a bandwidth (BW).

11. The O-RU of claim 10, wherein each of said plurality of delay management profiles is given a delay management profile identification.

12. The O-RU of claim 10, wherein said electronic circuitry is further adapted to perform an operation of:
    receiving, from an Open Radio Access Network Distributed Unit (O-DU) in said O-RAN, in a control-plane message, a section extension that includes a delay management profile identification (ID) that identifies a delay management profile to be used for a user-plane resource.

13. The O-RU of claim 12, wherein said delay management profile ID refers to delay parameters of a control-plane message.

14. The O-RU of claim 10, wherein said electronic circuitry is further adapted to perform an operation of:
receiving from an Open Radio Access Network Distributed Unit (O-DU) in said O-RAN, in a control-plane message, a section extension that indicates a transmit window and a delay offset to be used for a time/frequency resource.

15. The O-RU of claim 10, wherein said O-RU controller statically links, via a management-plane interface, a delay management profile in said plurality of delay management profiles, to traffic selected from the group consisting of user-plane traffic and control-plane traffic.

16. The O-RU of claim 10, wherein said O-RU controller configures said O-RU, via a management-plane interface, with a window size from said supported set of window sizes, and a window offset from said supported window offsets, for traffic selected from the group consisting of user-plane traffic and control-plane traffic.

17. The O-RU of claim 10, wherein said O-RU controller configures said O-RU via a management-plane interface by marking control-plane traffic as non-delay managed traffic.

18. The O-RU of claim 10,
wherein said O-RU controller resides in a service management and orchestration system (SMO), and
wherein said O-RU controller configures said O-RU in communications conducted between said O-RU controller and said O-RU via a management-plane interface.

19. An Open Radio Access Network Radio Unit controller (O-RU controller) comprising electronic circuity adapted to perform operations of:
receiving, from an Open Radio Access Network Radio Unit (O-RU) in an Open Radio Access Network (O-RAN), a message informing that said O-RU supports features including (a) a plurality of delay management profiles, and (b) a plurality of transmission window sizes;
receiving, from said O-RU to said O-RU controller, a report of capabilities of said O-RU, wherein said report comprises parameters including (a) a quantity of supported delay management profiles, (b) supported window sizes for each of said plurality of delay management profiles, and (c) a supported window offset for each of said plurality of delay management profiles; and
configuring said O-RU based on said features and said parameters;
wherein each of said plurality of delay management profiles is defined in terms of a subcarrier spacing (SCS) and a bandwidth (BW).

20. The O-RU controller of claim 19, wherein each of said plurality of delay management profiles is given a delay management profile identification.

21. The O-RU controller of claim 19, wherein said O-RAN also includes an O-RAN distributed unit (O-DU), and wherein said O-DU sends to said O-RU, in a control-plane message, a section extension that includes a delay management profile identification (ID) that identifies a delay management profile to be used for a user-plane resource.

22. The O-RU controller of claim 21, wherein said delay management profile ID refers to delay parameters of a control-plane message.

23. The O-RU controller of claim 19,
wherein said O-RAN also includes an O-RAN distributed unit (O-DU), and
wherein said O-DU sends to said O-RU, in a control-plane message, a section extension that indicates a transmit window and a delay offset to be used for a time/frequency resource.

24. The O-RU controller of claim 19, wherein said electronic circuitry is further adapted to perform an operation of statically linking, via a management-plane interface, a delay management profile in said plurality of delay management profiles, to traffic selected from the group consisting of user-plane traffic and control-plane traffic.

25. The O-RU controller of claim 19, wherein said electronic circuitry is further adapted to perform an operation of configuring said O-RU, via a management-plane interface, with a window size from said supported set of window sizes, and a window offset from said supported window offsets, for traffic selected from the group consisting of user-plane traffic and control-plane traffic.

26. The O-RU controller of claim 19, wherein said electronic circuitry is further adapted to perform an operation of configuring said O-RU via a management-plane interface by marking control-plane traffic as non-delay managed traffic.

27. The O-RU controller of claim 19,
wherein said O-RU controller resides in a service management and orchestration system (SMO), and
wherein said O-RU controller configures said O-RU in communications conducted between said O-RU controller and said O-RU via a management-plane interface.

* * * * *